(12) United States Patent
Panzella

(10) Patent No.: US 10,760,292 B2
(45) Date of Patent: *Sep. 1, 2020

(54) MOTOR CAN SEAL AND SHAFT

(71) Applicant: Richard Panzella, Westbury, NY (US)

(72) Inventor: Richard Panzella, Westbury, NY (US)

( * ) Notice: Subject to any disclaimer, the term of this patent is extended or adjusted under 35 U.S.C. 154(b) by 204 days.

This patent is subject to a terminal disclaimer.

(21) Appl. No.: 15/805,809

(22) Filed: Nov. 7, 2017

(65) Prior Publication Data

US 2018/0119443 A1 May 3, 2018

Related U.S. Application Data

(63) Continuation-in-part of application No. 14/599,526, filed on Jan. 18, 2015, now Pat. No. 9,822,542.

(Continued)

(51) Int. Cl.
| | |
|---|---|
| *H02K 5/10* | (2006.01) |
| *H02K 5/12* | (2006.01) |
| *F04B 1/04* | (2020.01) |
| *F16J 15/02* | (2006.01) |
| *F16J 15/06* | (2006.01) |
| *E04H 4/16* | (2006.01) |
| *H02K 5/124* | (2006.01) |
| *F16J 15/3232* | (2016.01) |
| *H02K 5/132* | (2006.01) |

(Continued)

(52) U.S. Cl.
CPC .......... *E04H 4/1654* (2013.01); *E04H 4/1645* (2013.01); *F04B 1/0448* (2013.01); *F16J 15/022* (2013.01); *F16J 15/062* (2013.01); *F16J 15/104* (2013.01); *F16J 15/3232* (2013.01); *H02K 5/10* (2013.01); *H02K 5/124* (2013.01); *H02K 5/132* (2013.01); *B25J 11/0085* (2013.01)

(58) Field of Classification Search
CPC ............ H02K 5/10; H02K 5/124; H02K 5/12; H02K 5/128; H02K 5/132; F04B 1/0448; F16J 15/021; F16J 15/022; F16J 15/025; F16J 15/062; F16J 15/104; F16J 15/3204; F16J 15/3232; F16J 15/3236
USPC .......................... 277/626, 644, 647, 608, 910
See application file for complete search history.

(56) References Cited

U.S. PATENT DOCUMENTS 5,112,066 A * 5/1992 Remmerfelt ......... F16J 15/0887
123/193.4
5,475,275 A * 12/1995 Dohogne ................. H02K 5/15
310/89

(Continued)

FOREIGN PATENT DOCUMENTS

| DE | 12015108205 A1 * | 12/2016 | ............... F16J 13/02 |
| FR | 2719882 A1 * | 11/1995 | ............... A47J 27/05 |
| WO | WO-2012032678 A1 * | 3/2012 | ............ F16J 15/3232 |

*Primary Examiner* — Ryan D Kwiecinski
(74) *Attorney, Agent, or Firm* — Gloria Tsui-Yip, Esq.; Gottlieb, Rackman & Reisman, P.C.

(57) ABSTRACT

A universal device for capping and mounting a motor within a motorized pool cleaner housing that allows a motor pump to be installed in different brands of pool cleaners and used at increased depths underwater. An improved motor can seal has an outer seal having a first diameter, an inner seal having a second diameter and an intermediate seal connecting the outer seal to the inner seal where the inner seal is tapered towards the distal end of the inner seal. An improved motor shaft is used having a head section, a body section and a seal area, wherein the seal area is hard chrome plated.

5 Claims, 17 Drawing Sheets

Related U.S. Application Data

(60) Provisional application No. 61/929,767, filed on Jan. 21, 2014.

(51) Int. Cl.
   *F04B 1/0448* (2020.01)
   *F16J 15/10* (2006.01)
   *B25J 11/00* (2006.01)

(56) References Cited

U.S. PATENT DOCUMENTS

| | | | | |
|---|---|---|---|---|
| 5,524,860 A * | 6/1996 | Ives | | F04B 39/12 |
| | | | | 248/674 |
| D454,539 S * | 3/2002 | Poag | | D13/122 |
| D456,773 S * | 5/2002 | Poag | | D13/122 |
| 8,584,359 B1 * | 11/2013 | Bowman | | F16H 1/46 |
| | | | | 29/893.1 |
| 2001/0045709 A1 * | 11/2001 | Stobbart | | F16J 15/062 |
| | | | | 277/602 |
| 2006/0269407 A1 * | 11/2006 | Maass | | F16J 15/3232 |
| | | | | 415/231 |
| 2009/0282627 A1 * | 11/2009 | Porat | | G06Q 20/3255 |
| | | | | 15/1.7 |
| 2010/0253010 A1 * | 10/2010 | Tohdoh | | F16J 15/0887 |
| | | | | 277/608 |
| 2010/0288906 A1 * | 11/2010 | Piech | | H02K 7/1004 |
| | | | | 248/636 |
| 2011/0156526 A1 * | 6/2011 | Lau | | H02K 9/06 |
| | | | | 310/216.129 |
| 2013/0152317 A1 * | 6/2013 | Erlich | | B08B 9/08 |
| | | | | 15/1.7 |
| 2013/0207491 A1 * | 8/2013 | Hatfield | | H02K 9/22 |
| | | | | 310/50 |
| 2014/0081463 A1 * | 3/2014 | Igarashi | | B01F 13/1063 |
| | | | | 700/265 |
| 2015/0337555 A1 * | 11/2015 | Hui | | E04H 4/1636 |
| | | | | 15/1.7 |
| 2016/0047474 A1 * | 2/2016 | Toth | | F16J 15/3244 |
| | | | | 277/559 |
| 2016/0145884 A1 * | 5/2016 | Erlich | | E04H 4/1636 |
| | | | | 15/1.7 |

* cited by examiner

MOTOR CAN SEAL AND SHAFT

CROSS-REFERENCE TO RELATED APPLICATION

This is a continuation-in-part of U.S. patent application Ser. No. 14/599,526 filed on Jan. 18, 2015, which has now issued as U.S. Pat. No. 9,822,542, which is the non-provisional application of provisional patent application Ser. No. 61/929,767 which was filed on Jan. 21, 2014, which are hereby incorporated by reference.

FIELD OF THE INVENTION

This invention relates to a motor can seal and shaft for a pump motor mount and cap that is used in robotic swimming pool cleaners. In particular, an improved motor can seal and shaft for a pump motor mount device is disclosed that is uniquely configured to provide a water tight seal that is sustainable underwater at higher depths.

BACKGROUND OF THE INVENTION

Pump motors are commonly used in robotic swimming pool cleaners. Pump motors are used for pulling water through the filter of the robotic swimming pool cleaner. There are currently many different models of robotic swimming pool cleaners. Many different brands require a unique pump motor mount in order to install the pump motor within the swimming pool cleaner housing. Therefore, in order to install a pump motor within a swimming pool cleaner housing, it is required that a corresponding motor mount is used. In addition, the motor mount seals available use a standard circular o-ring to provide a water-tight seal that does not always perform, especially at increased depths. The o-ring is limited in size, sealing capabilities and leaves many unsealed areas. Therefore, the pump motors must have a water-tight seal that is sustainable underwater at increased depths where the pressure is higher.

Stamping the motor can and/or molding the pump motor mount is difficult and there can be inconsistencies from part to part. The depth of the motor can may vary. Also the motor can machining step also allows for variations in the depth of the motor can flange and the pump motor cap flange where the seal/o-ring is installed. There is also a variation in the exact shape of the motor can, motor can flange, and cap flanges which makes providing a seal for these two parts extremely difficult.

Therefore, there is a need for a pump motor mount that can be used to install a pump motor in different robotic pool cleaners without having to change the pump motor mount or cap that provides a water-tight seal that is sustainable at increased depths where the pressure is higher. There is also a need for a seal/o-ring that can be used to seal a motor can and motor mount cap and provide a water-tight seal.

SUMMARY OF THE INVENTION

The present invention is a pump motor mount and cap that facilitates installing a pump motor within the housing of different brands of robotic pool cleaners.

The universal motor mount and cap of the present invention comprises a base having a central opening and a plurality of post pairs extending from the base.

The universal device for capping and mounting a motor within a motorized pool cleaner comprises a base having an edge and first and second surfaces and a central through opening and at least first and second sets of posts extending substantially perpendicular from said first surface of said base, each said post is adapted to engage the housing of the pool cleaner; said first set of posts extending from said first surface of said base adjacent said edge, said first set of posts defining a first footprint, said second set of posts extending from said first surface of said base adjacent said first set of posts, said second set of posts extending from said first surface of said base adjacent said first set of posts, said second set of posts defining a second footprint smaller than said first footprint.

The present invention also comprises an improved motor can seal having an outer seal, an inner seal and an intermediate seal. The outer seal has a first diameter, the inner seal has a second diameter and the intermediate seal connects the outer seal to the inner seal where the first diameter is larger than the second dimeter and were the inner seal is tapered towards the distal end of the inner seal. In one embodiment of the present invention, the inner seal has the cross sectional shape of a wedge.

The present invention also comprises an improved motor shaft having a head section and a body section. The body section has a first end and a second end. The first end of the body section abuts the head section. Extending from the first end of the body section towards the second end is a seal area. The seal area is polished hard chrome plated to aid in the seal of the improved motor shaft and resist abrasion from the imperfections in pool water.

BRIEF DESCRIPTION OF THE DRAWINGS

A preferred embodiment of the present invention has been chosen for purposes of illustration and description and is shown in the accompanying drawings forming a part of the specification wherein.

DETAILED DESCRIPTION OF THE PREFERRED EMBODIMENTS

Figure 1A:
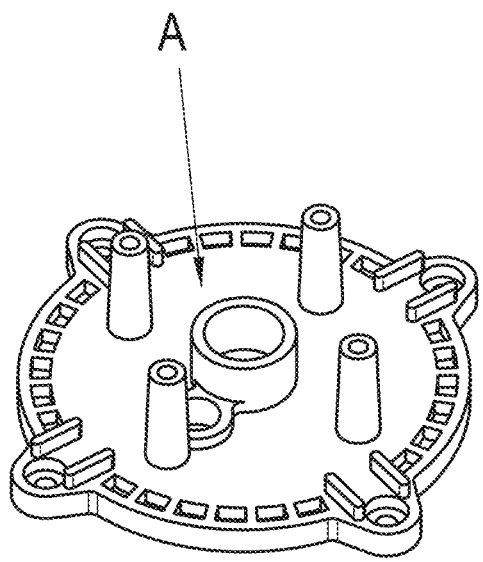
FIG. 1A is the top view of a prior art top flange.
Figure 1B:
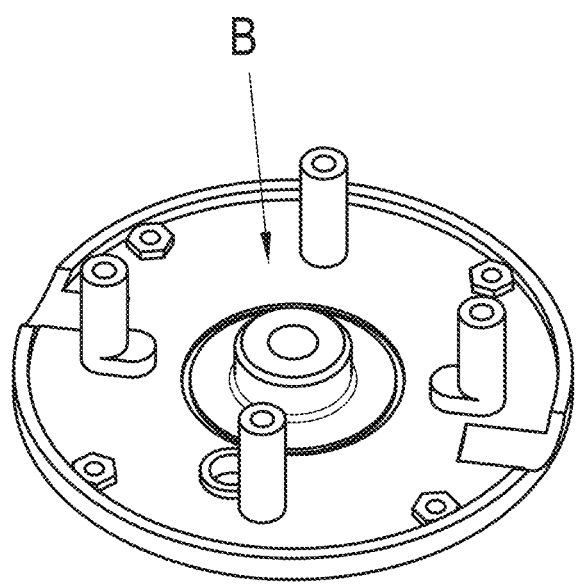
FIG. 1B is the top view of another prior art top flange.
Figure 1C:
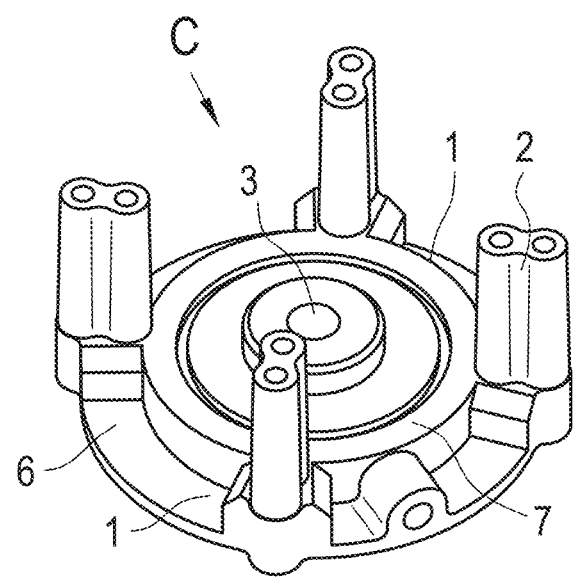
FIG. 1C is the perspective view of a first embodiment of the universal motor mount and cap of the present invention.

With reference to the drawings, wherein the same reference number indicates the same element throughout, there is shown in FIGS. 1A-B two prior art plastic motor mount top flanges A and B. A perspective view of the universal motor mount and cap of the present invention is shown as C in FIG. 1C. As shown in FIG. 1C, the universal motor mount and cap C for use within a motorized pool cleaner housing comprises a base 1, at least first and second sets of posts 2 and a central opening 3 that extends through the base 1. The base 1 has an edge and first and second opposite surfaces. As shown, the edge is the circumference of the round base 1. It is contemplated the base 1 can be any shape that corresponds to the motor of the swimming pool cleaner. The first surface of the base 1 is shown as the top surface. The second surface of the base 1 is shown as the bottom surface. The first and second sets of posts 2 extend substantially perpendicular from the first surface of the base 1 adjacent the edge. As shown in FIG. 4B, the first (and outer) set of posts define a first footprint X that in the preferred embodiment of the present invention is the circumference of the outer edge of the base 1. The second (and inner) set of posts extend from the first surface of the base 1 adjacent the first set of posts and define a second footprint Y that is smaller than the first footprint. In the preferred embodiment the second sets of posts abut the first set of posts and the second footprint has a slightly smaller circumference than the first footprint.

The universal motor mount and cap C of the present invention as shown in FIG. 1 has two motor mount transition flanges 6 and 7. In the preferred embodiment of the present invention, the motor mount of the present invention is made from aluminum. It is contemplated it can be made from other metals or plastics.

Figure 2A:
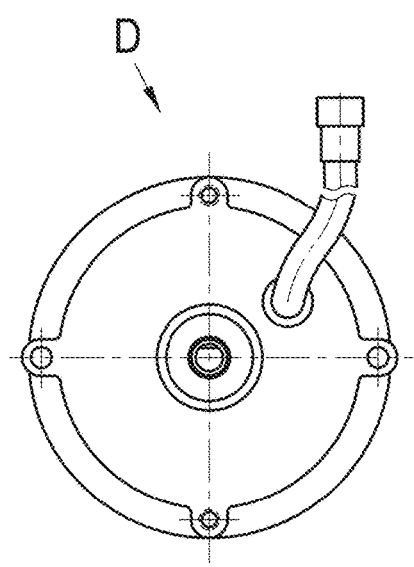
FIG. 2A is a top view of a prior art swimming pool cleaner motor housing with a cap.
Figure 2B:
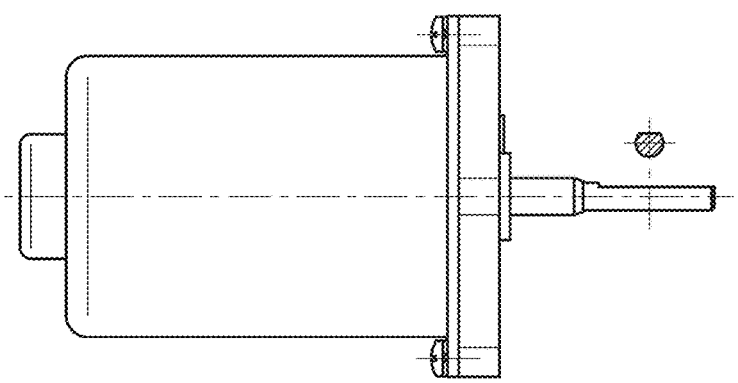
FIG. 2B is a side view of FIG. 2A.

The prior art aluminum motor cap D shown in FIGS. 2A-B in combination with either top flange A or B of FIGS. 1A and B, is replaced by one aluminum motor mount (with top flange) and cap combo C with a plurality of post sets 2 as shown in FIG. 1C for installing the motor within the housing of different robotic swimming pool cleaners. In the preferred embodiment and as shown in FIG. 1C, the motor mount and cap C has two sets of posts 2, each set includes four posts, with eight total posts. As described above, the sets of posts 2 comprises an inner set of four posts defining the second footprint and an outer set of four posts defining the first footprint. The inner set of posts (i.e. closer to the center) that create the second footprint are adapted to attach to a pool cleaner that would have accepted prior art top flange A as shown in FIG. 1C. The outer set of posts (i.e. further from the center) that create the first footprint are adapted to attach to a pool cleaner that would have accepted prior art top flange B as shown in FIG. 1B. Essentially, the first and second sets of posts are concentrically positioned. While two sets of posts are shown, additional concentric sets of posts are contemplated. Similarly while four posts are shown in each set, more or less posts in each set is contemplated.

Figure 7:
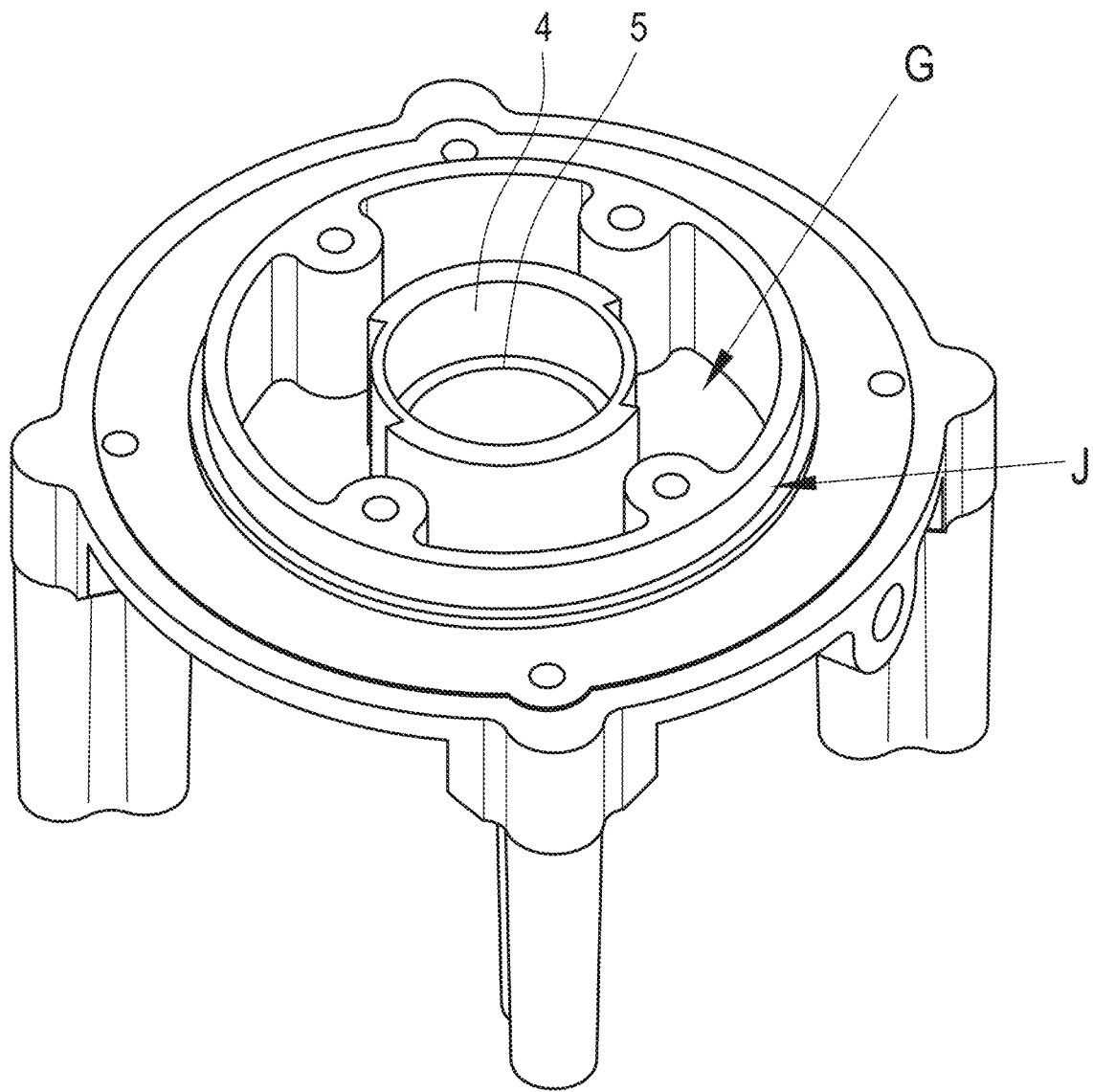
FIG. 7 is a bottom view of the universal motor mount and cap of the present invention.

In one embodiment, the universal motor mount and cap C of the present invention is designed to accept two oil seals, an outer o-ring and a middle shaft seal o-ring. The middle shaft seal o-ring is to be accepted in the central through opening 3 of the universal motor mount cap C. The universal motor mount and cap C includes a re-design of the bottom gland 4 to extend and improve the O-ring used in the middle shaft seal, which includes an O-ring that will allow the motor to operate at greater water depth and greater pounds per square inch. The bottom gland 4, the area where the O-ring sits when installed, is re-designed to be ridged and includes a lip 5 around the inside perimeter of the universal motor mount and cap C in order to secure the O-ring so it does not move out of place at higher pressures or water depths. The O-ring will be increased to about 90 durometer hardness. In one embodiment of the present invention the O-ring is constructed from nitrile. FIG. 7 shows the bottom view of the universal motor mount and cap C. The outer o-ring is to be accepted around the rim J, as shown in FIG. 7 which is the location of the bottom universal motor mount cap C where it meets the motor housing when installed.

In one embodiment of the present invention, the central through opening 3 of the universal motor mount and cap C is designed to accept the O-ring currently available as "Twin Lipped Radial Shaft Seal" which is made of steel, wrapped in nitrile, has a stainless steel radial spring wrapped around the shaft hole diameter in between the twin lip. One such O-ring is currently available and manufactured by NAK, as NAK Part No. 8X19X7ADL. The seal will prevent water from entering into the brushed DC motor in a broad range of both low water pressure (approx. 1 psi=2.31 feet of depth) and high water pressure (approximately 15 psi=34.65 feet of depth) and provides contact between the motor shaft and the seal in two places rather than one. The prior art seal used in connection with prior art motor caps only keeps water out at low pressure of approximately 2.6 psi=6 feet. It is noted that oil seals are generally designed to either keep water out at low pressure or at high pressure, but not both low and high pressure as provided in the present invention.

In another embodiment of the present invention an additional improved motor can seal 40 is used. The improved motor can seal 40 is shown in FIGS. 10-13 and 20-21. The improved motor can seal 40 has an outer seal 44 having a first diameter and an inner seal 42 having a second diameter. The inner seal 42 extends from the outer seal 44 and connected by an intermediate seal 43. The diameter of the outer seal 44 is larger than the diameter of the inner seal 42. Between the outer seal 44 and the inner seal 42, the intermediate seal 43 has a thickness 48. The total sealing surface 41 is the heights of the outer seal 44 and the inner seal 42 and the thickness 48 of the intermediate seal 43 combined. In the preferred embodiment the sealing surface 41 is about 0.20 inch on the inner surface of the motor can flange 10A at a point where the radius narrows into the motor can 10. Cap C' is shown with minimal features in FIG. 20 to better illustrate the improved motor can seal 40 and improved motor shaft 50. The motor can 10 flange is thin, has imperfections and lacks surface area for any seal to stay in place during assembly with four screws (not shown). The seal 40 of the present invention allows for the seal 40 to stay in place during assembly to the motor can 10 and cap C' thereby keeping water out of the motor. The wedge shape 46 of the seal 40 is advantageously distorted during assembly as it is capable of compressing and being squished in all directions to provide a more effective/efficient seal to keep water out as it seals between the vertical wall of the universal motor mount cap C' and the inside of the motor can 10 and compensates for the variation of the radius and size caused during the stamping of the motor can and machining of the flange area J. The intermediate seal 43 seals as the universal motor mount cap C' is tightened down on the motor can 10. The seal 40 allows for the device to be used at greater underwater depths in a swimming pool without leaking.

Figure 13:
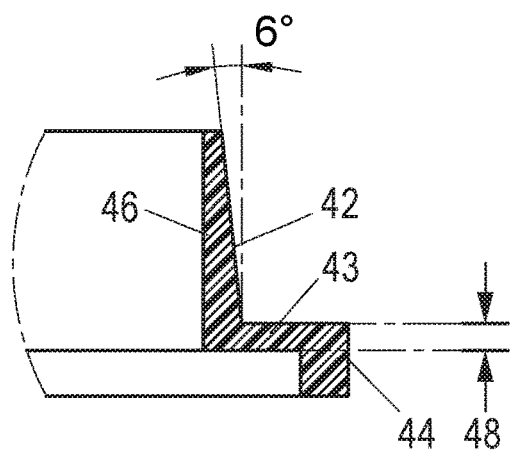
FIG. 13 is an enlarged cross sectional view of portion A of FIG. 11 of the improved motor can seal.
Figure 14:
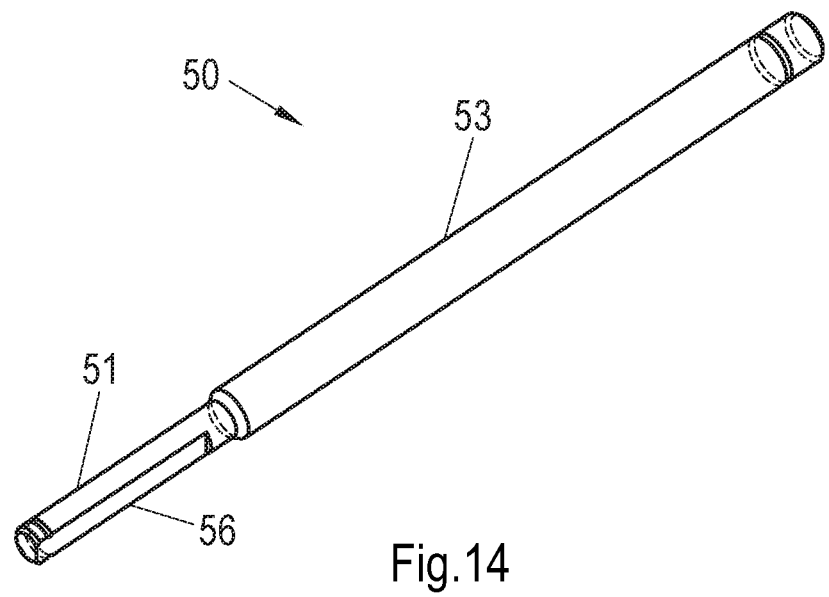
FIG. 14 is a perspective view of the improved motor shaft of the present invention.
Figure 15:
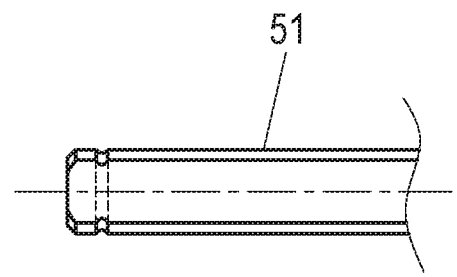
FIG. 15 is an enlarged side view of a portion of the head section of the improved motor shaft.
Figure 16:
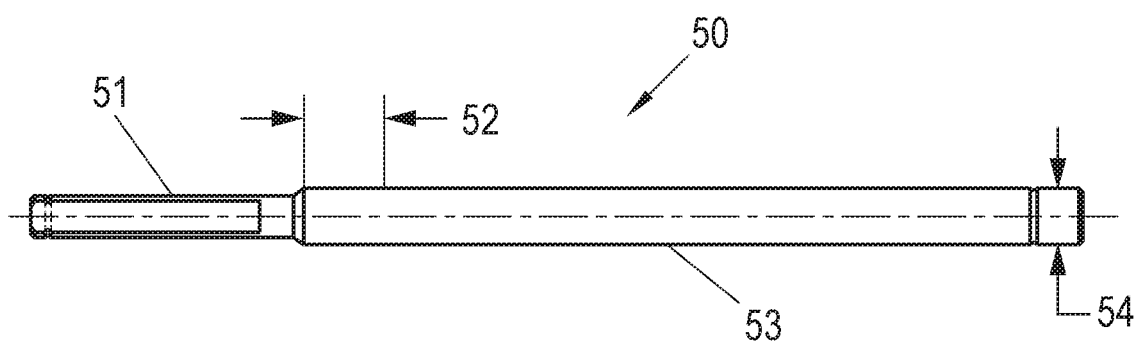
FIG. 16 is a side view of the head section of the improved motor shaft.
Figure 17:
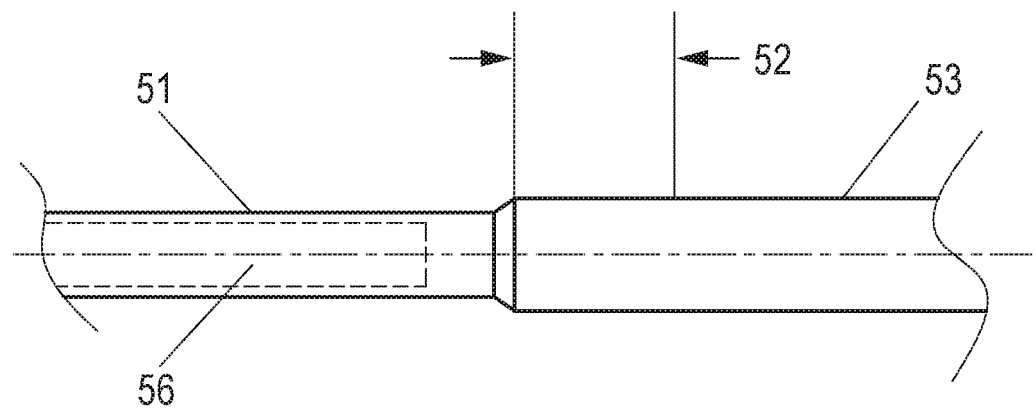
FIG. 17 is an enlarged side view of a portion of the head section and the body section of the improved motor shaft.
Figure 18:
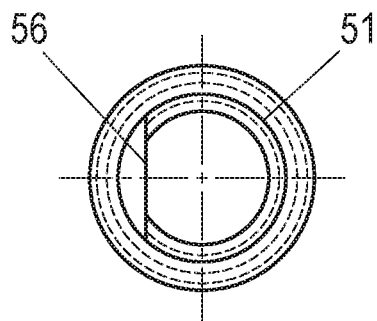
FIG. 18 is a left side view of the improved motor shaft.
Figure 19:
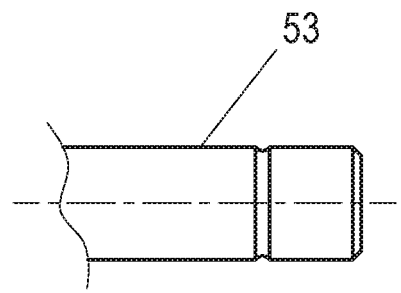
FIG. 19 is an enlarged side view of a portion of the body section of the improved motor shaft.

The inner seal 42 is tapered and has a cross-sectional shape of a wedge 46. In the preferred embodiment the angle of the wedge 46 is about six degrees as shown in FIG. 13. As shown in FIG. 13, the outer wall of the wedge 46 is at an angle and the inner wall is vertical. The wedge 46 aids in the seal of the motor mount C' and fits over the rim J and seals against the inner wall of the motor can 10 flange area 10A past the sealing surface of a prior art standard O-ring thereby strengthening the seal 40. The diameter of the outer seal 44 is smaller than the diameter of prior art machined seals thereby allowing the compression of the outer seal 44 and providing an area for such compression during assembly.

Figure 20:
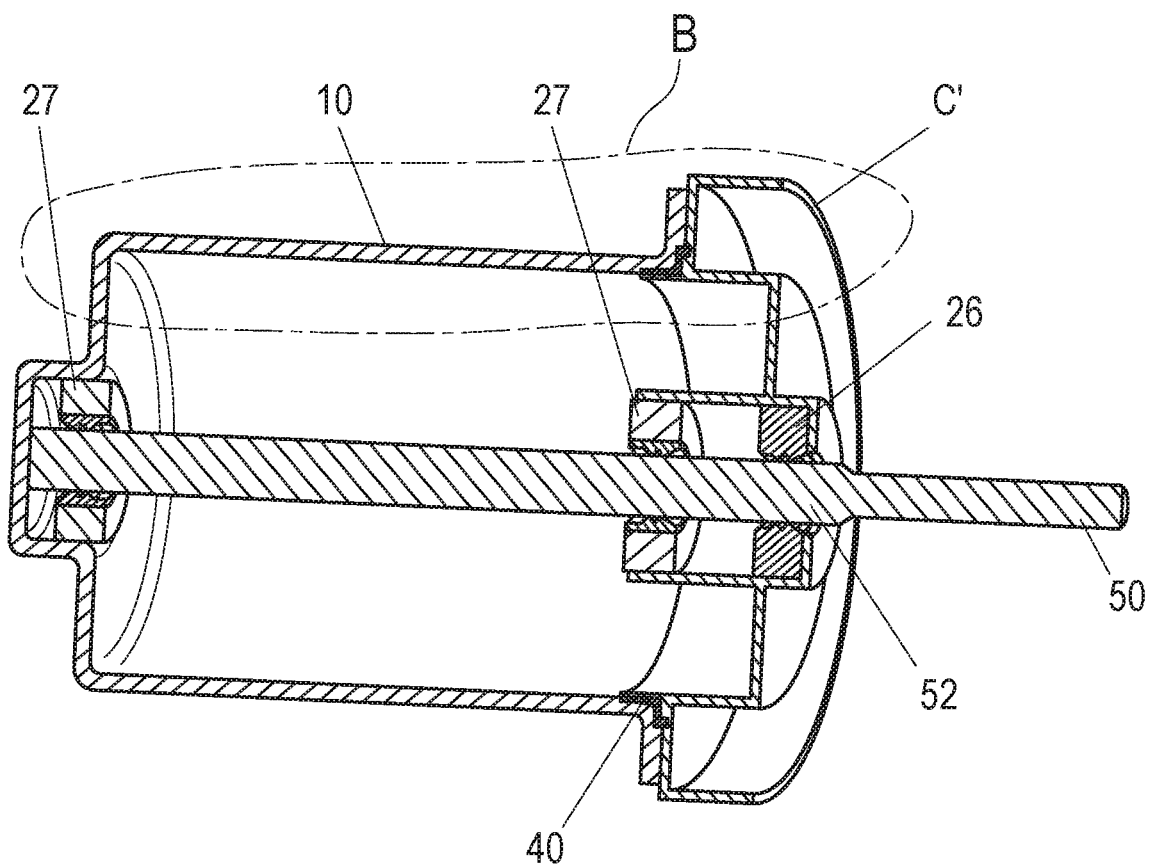
FIG. 20 is a simplified side cross sectional view of the universal motor mount and cap installed on a motor can (with the motor removed for clearer illustration) with the improved motor shaft in place.
Figure 21:
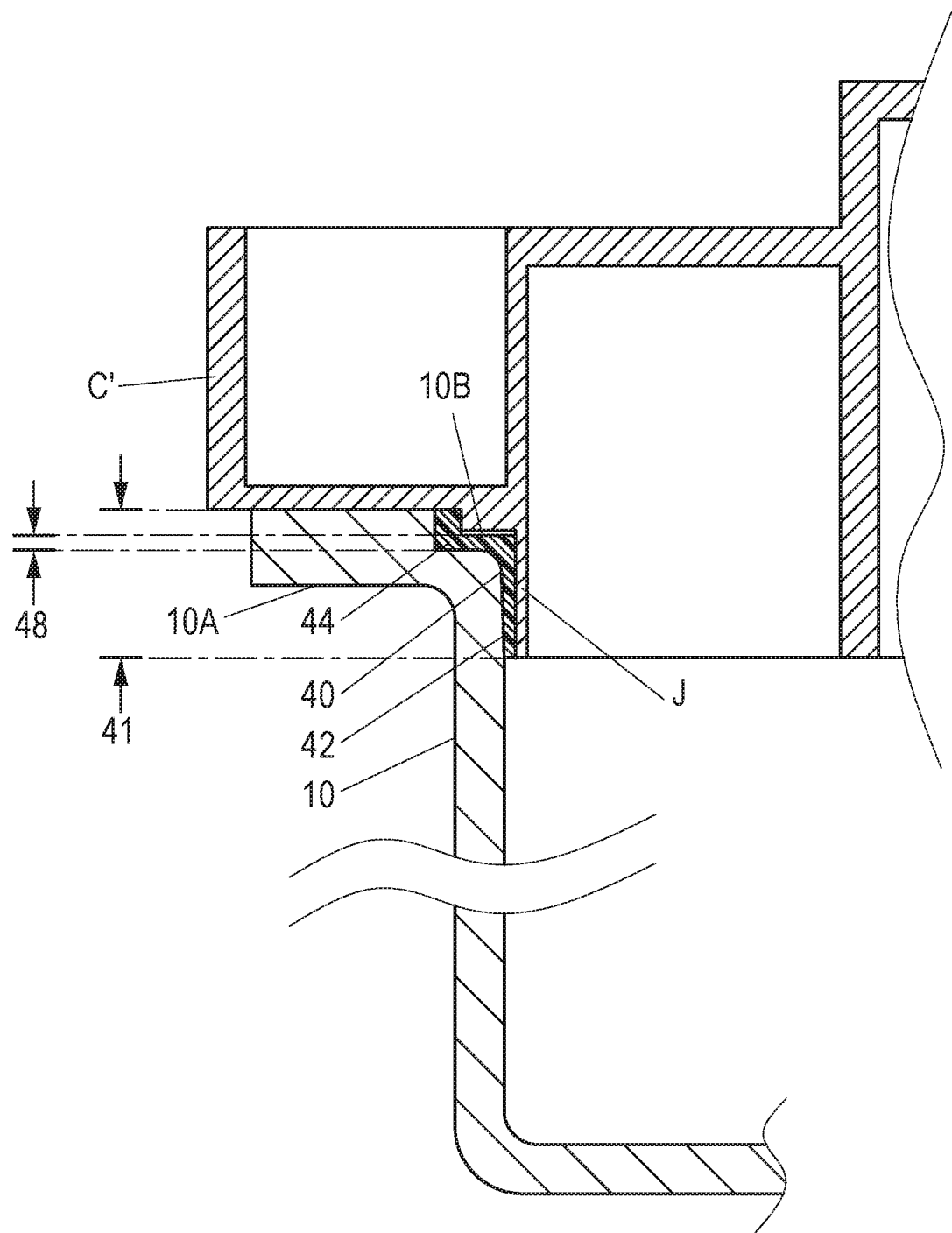
FIG. 21 is a magnified detail of portion B of FIG. 20 showing the interaction of the cap, seal and motor can.
Figure 22:
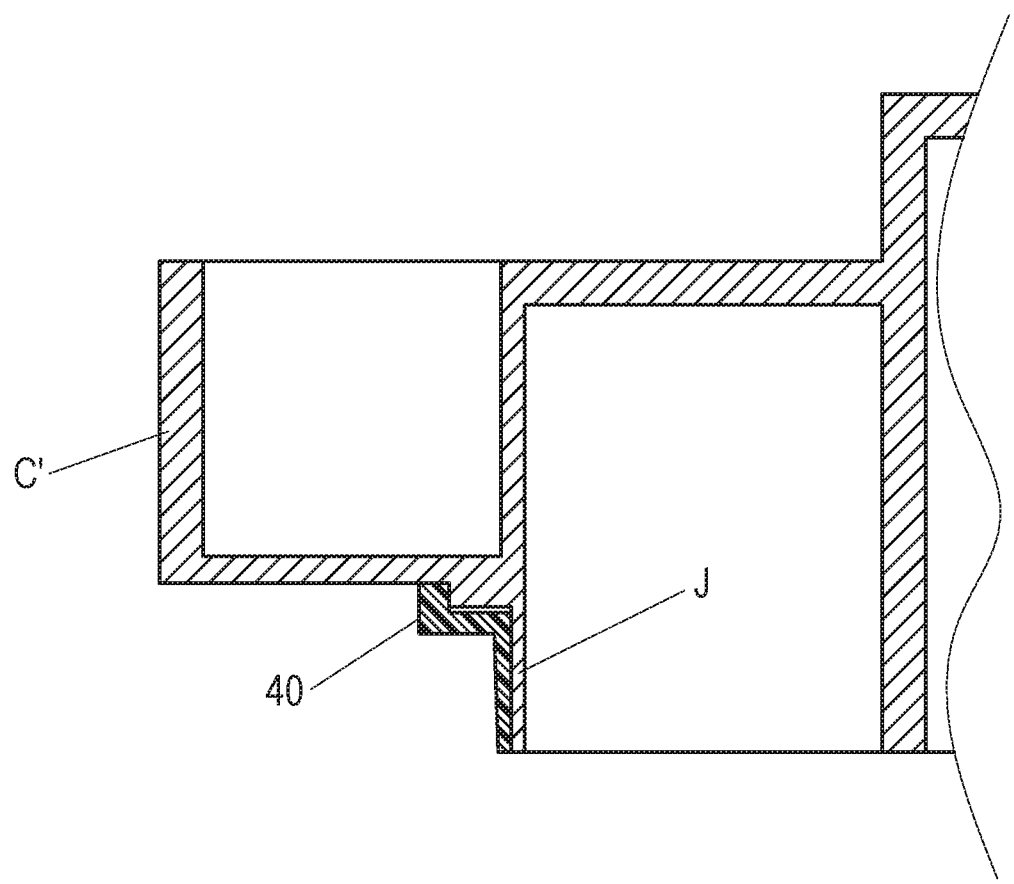
FIG. 22 is the same view as FIG. 21 showing the seal on the cap without the motor can.

As shown in FIGS. 20-22, the improved motor can seal 40 seals in a plane perpendicular to the axis of the shaft 50 between the motor can flange area 10A and the cap C'. At the same time, the wedge 46 forms a seal that parallels the axis of the motor shaft 50. The thickness 48 between the perpendicular and the parallel axes allows the seal of the improved motor can seal 40 to be properly positioned at assembly. In the preferred embodiment the thickness 48 is 0.01 inch. Further, as the cap C' is tightened the wedge 46 is compressing and conforming to the inside diameter of the motor can flange 10A providing twice the sealing capability of a prior art O-ring and allowing the motor to be used at increased depths of water where the pressure is higher. FIG. 21 shows the interaction of the cap C' with the improved motor can seal 40 and the motor can 10 when the cap C' is in in an installed position and the seal 40 is compressed. The seal 40 compensates for the imperfections in the motor can because in the stamping process to create the motor the edges are not perfectly perpendicular and instead cause a rounded edge having a radius at 10B. FIG. 22 shows the improved motor can seal 40 on the cap C' not installed on the motor can 10 in uncompressed state. In the preferred embodiment the improved motor can seal 40 is made from natural elastacon having a 60 durometer hardness. The improved motor can seal 40 allows for a static seal that experiences external pressure. The universal motor mount and cap C' is bolted or attached to the brushed DC pump motor body integrally with the motor can 10 and the two components form a complete pump motor for robotic swimming pool cleaners. The improved shaft 50 of the pump motor extends through the central opening of the mount and cap C' and through the bearings 27 and seal 26. A propeller (not shown in FIG. 20) is attached to the distal end of the shaft 50.

The universal motor mount and cap C has two transition flanges 6 and 7 and can now replace the individual prior art cap D shown in FIGS. 2A-B and motor mount top flanges A or B shown in FIGS. 1A-B. An advantage of the present invention is that various prior art motors can be retro fitted with the universal motor mount and cap C of the present invention so that the retro fitted motor can fit into different prior art machine housings.

Figures 3A, 3B:
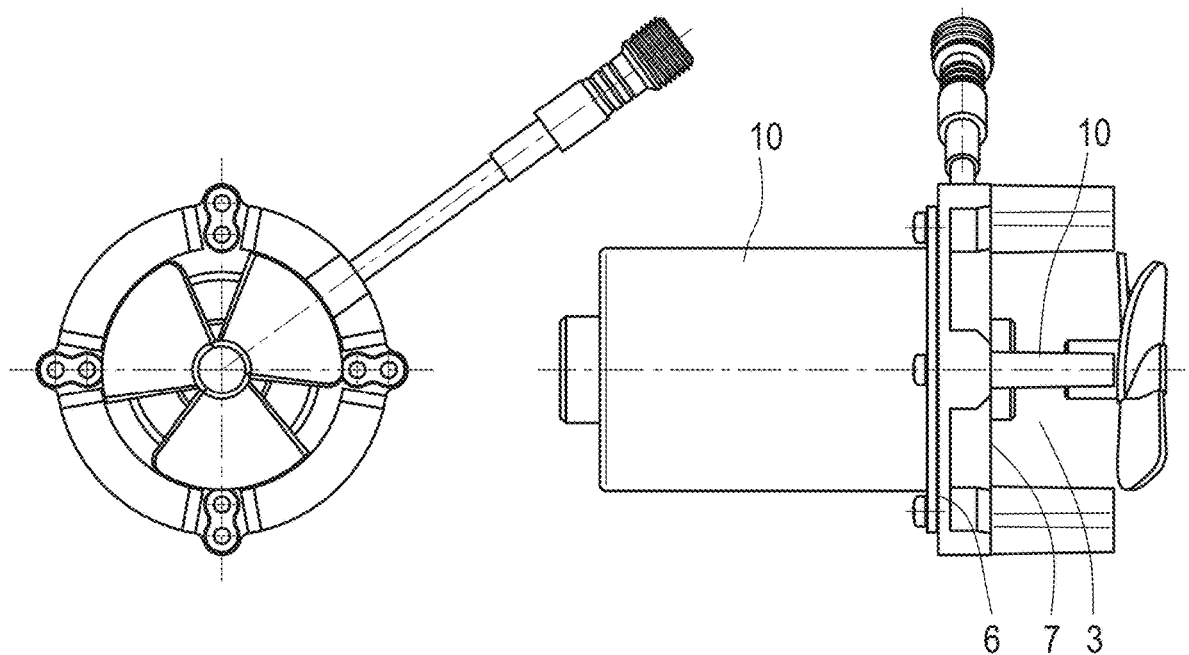
FIG. 3A is the top view of the universal motor mount and cap of the present invention mounted on a motor housing with the motor connected to a propeller.
FIG. 3B is the side view of FIG. 3A.
Figure 3C:
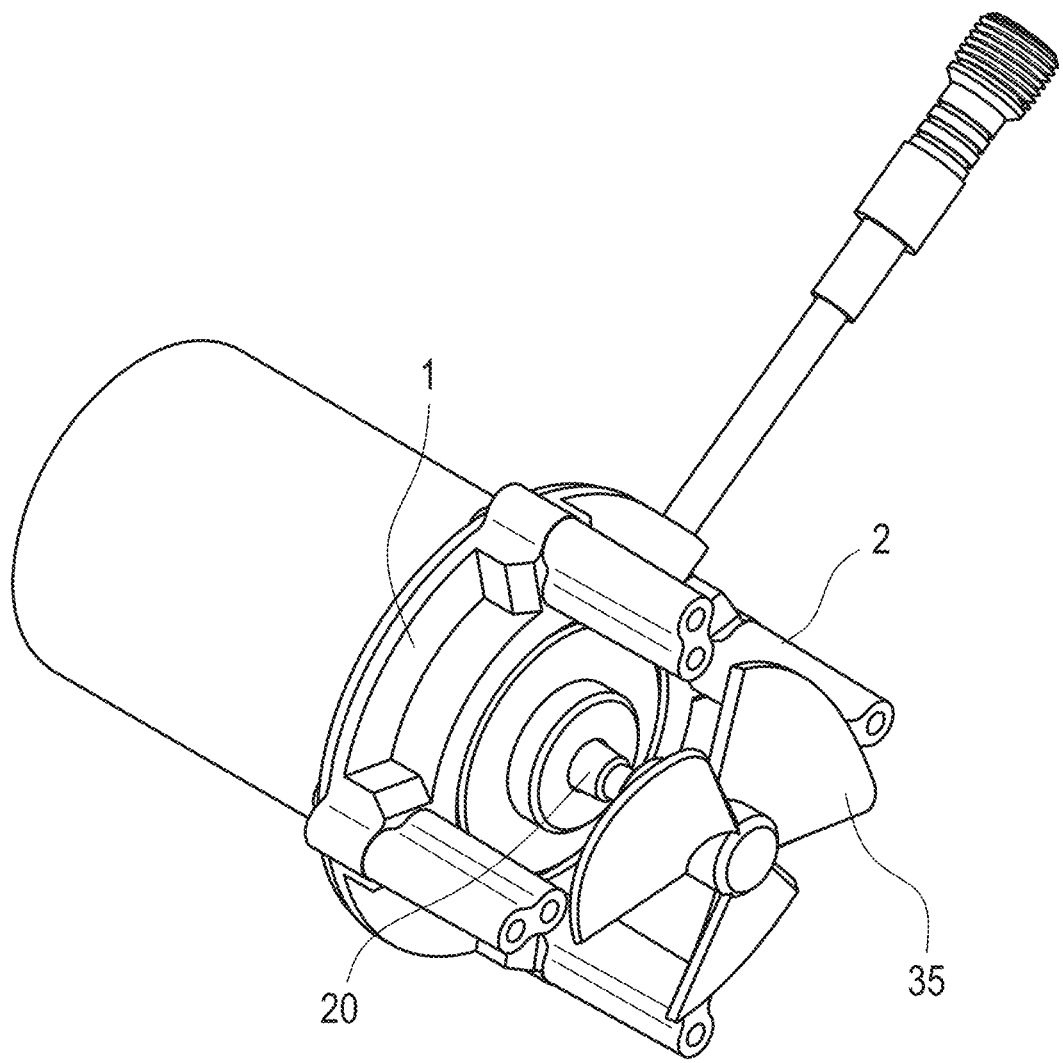
FIG. 3C is the perspective view of FIG. 3A.

The universal motor mount and cap C is bolted or attached to the brushed DC pump motor body and the two components form a complete pump motor 10, as shown in FIGS. 3A-3B, for robotic swimming pool cleaners. The shaft 20 of the pump motor extends through the central opening 3 of the mount and cap C. A propeller 35 is attached to the distal end of the shaft 20. The complete motor 10 can be installed within different pool cleaner housings utilizing either the first or second sets of posts 2.

Figure 4A:
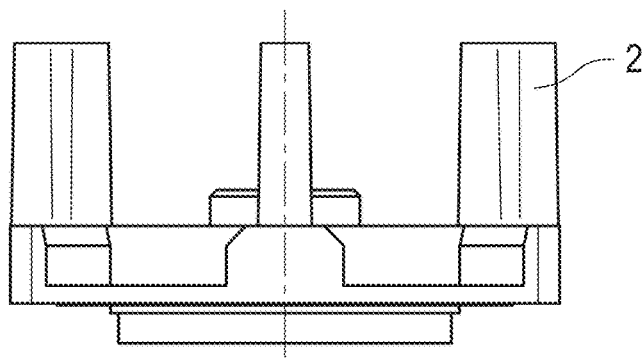
FIG. 4A is a side view of the universal motor mount and cap of the present invention.
Figure 4B:
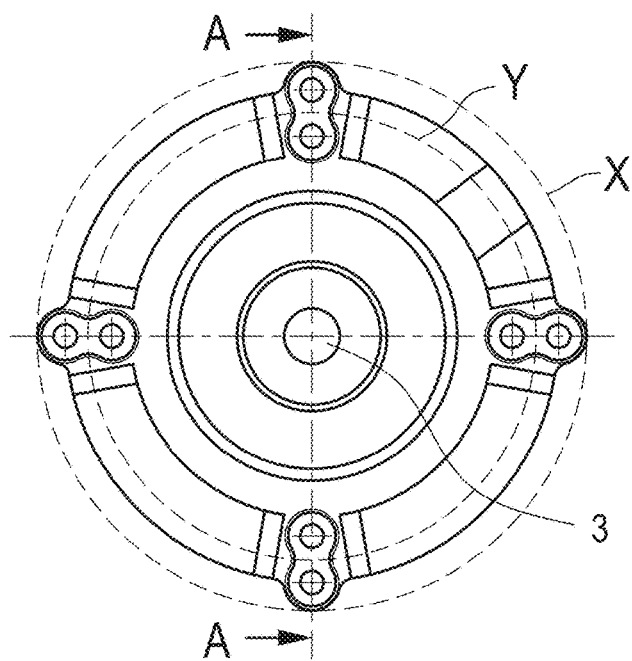
FIG. 4B is a top view of the universal motor mount and cap of the present invention.
Figure 4C:
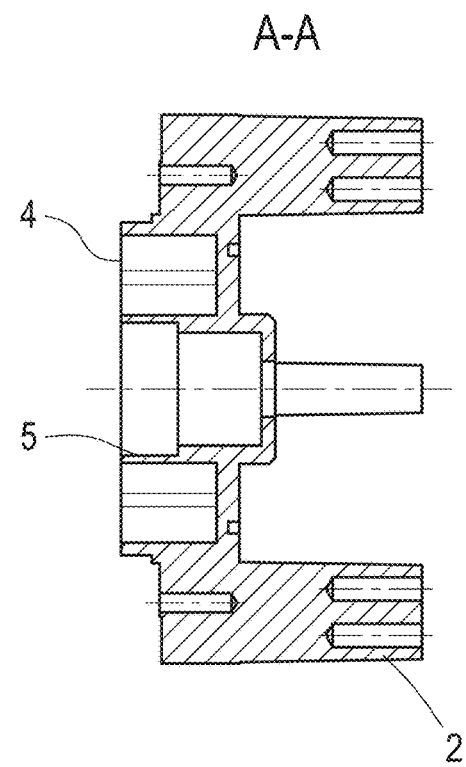
FIG. 4C is a cross sectional view taken along line C-C in FIG. 4B of the universal motor mount and cap of the present invention.

As shown in FIGS. 4A-4C, another improvement of the present invention is that the depth of the central through opening 3 of the universal motor mount and cap C is increased compared to the prior art mounts, allowing the opening 3 of the universal motor mount and cap C to house both the "Twin Lipped Radial Shaft Seal" and the top motor bearing. The prior art motor top D can only house the top motor bearing.

In another embodiment of the present invention, the stainless steel motor shaft will be polished where it interacts with and engages the "Twin Lipped Radial Shaft Seal" to a high polished finish as listed by the Society of the Plastic Industries, a SPI #3 finish/11 to 6 micron polished finish. This extends the life of the "Twin Lipped Radial Shaft Seal" to prevent water from entering the motor.

In another embodiment of the present invention an improved motor shaft 50 is used. The improved motor shaft 50 is shown in FIGS. 14-20. The improved motor shaft 50 has a head section 51 and a body section 53. The head section 51 has a smaller cross section then the body section 53. In one embodiment, the body section 53 has a diameter of about 0.315 inch and the head section 51 has a diameter of about 0.236 inch. The head section 51 has a cutout 56 that allows the motor shaft 50 to cooperatively mate with a propeller or gear and be driven by a motor. In one embodiment, the entire improved motor shaft 50 is plated in 316 stainless.

The body section 53 has a first end and a second end. The first end of the body section 53 abuts the head section 51. Extending from the first end of the body section 53 towards the second end is a seal area 52. In the preferred embodiment, the seal area 52 is about 0.5 inch long. The seal area 52 is plated to aid in the seal of the improved motor shaft 50 to the motor mount and cap C'. At the contact point between the seal area 52 of the motor shaft 50 and the motor, is a seal 26. This seal was described earlier, and in the preferred embodiment is the "Twin Lipped Radial Shaft Seal" 26. In one embodiment, the seal area 52 is plated in 4-8 RMS (finish) polished hard chrome plating and is about 0.004 inch thick. In one embodiment the seal area is 20-25% of the body section of the motor shaft. In another embodiment, the entire improved motor shaft 50 can be plated with the same material. When assembled, the second end of body section 53 of the improved motor shaft 50 engages the motor (not shown) and is driven by the motor. The motor rotates the improved motor shaft 50 which moves within the motor bearings and the "Twin Lipped Radial Shaft Seal" 26. The constant rotation wears at the seal between the shaft 50, the "Twin Lipped Radial Shaft Seal" 26 and the bearing 27 of the motor. The seal area 52 of the motor shaft 50 prevents the seal from wearing thin and allowing water to get into the motor.

Figure 5:
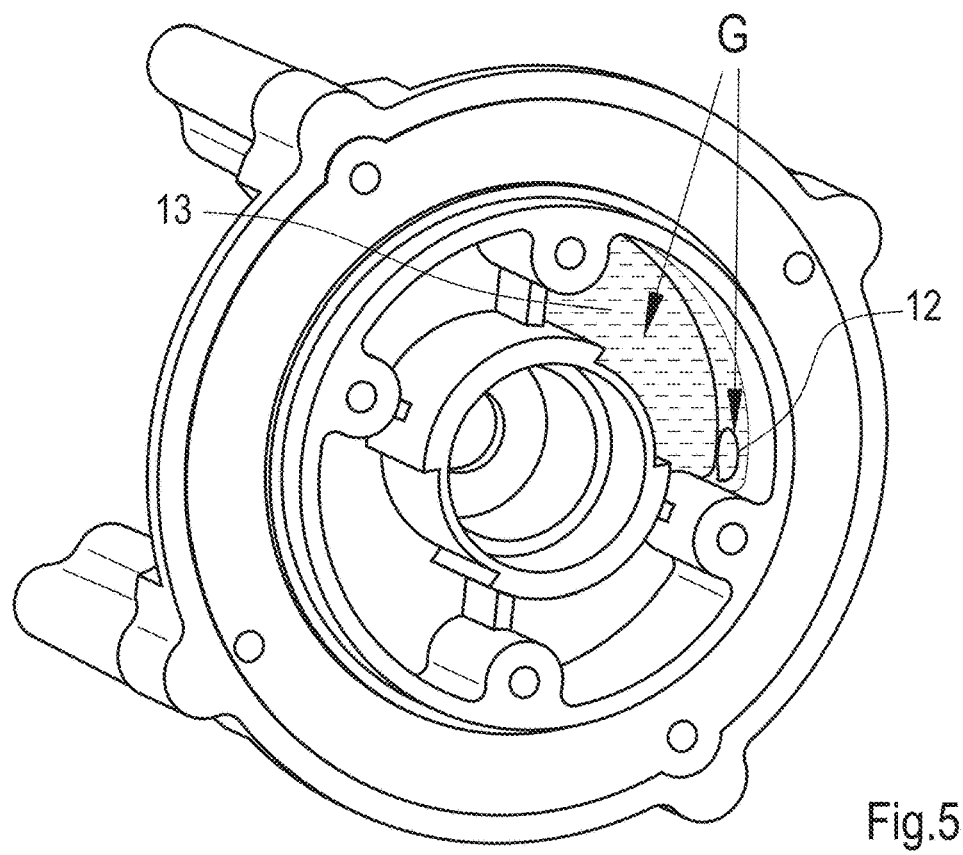
FIG. 5 is an enlarged view of the bottom view of the universal motor mount and cap of the present invention.

FIG. 5 shows another embodiment of the present invention relating to the installation of the electronic components in the universal motor mount and cap C, where the potting box area G located inside universal motor mount and cap C is capable of acting as one barrier wall of the potting box.

Figure 6:
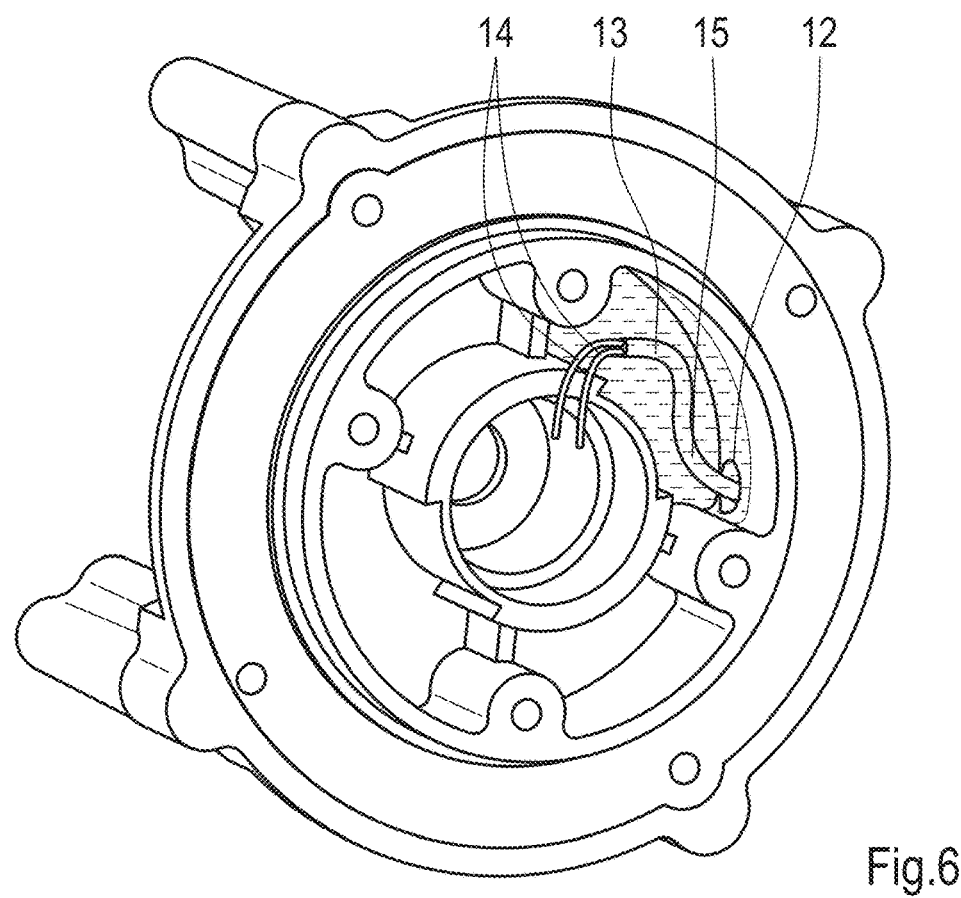
FIG. 6 is another enlarged view of the bottom view of the universal motor mount and cap of the present invention illustrating the position of the cable.

FIG. 6 shows one embodiment of the present invention for the cable installation using the universal motor mount and cap C. The method of how the cable is buried into a bed of epoxy is: first, the cable is bent ninety degrees upward from the cable hole 12, next, the two conductors elbow and rise up out of the epoxy bed ninety degrees outwardly, whereby maximizing the epoxy strength to seal out water from entering into the motor through the interior of the wire jacket and also through the cable hole 12 entrance of the universal motor mount and cap C. Bending the cable as shown before the epoxy is poured will also prevent water from entering the inside of the wire jacket inside the universal motor mount and cap C and prevent water back feeding or back flowing away from the cable hole 12 of the universal motor mount and cap C and damaging other electrical components, wiring, other electrical connections and connectors.

FIG. 7 shows the general potting box location G of the cable installation using the universal motor mount and cap C as also shown in FIGS. 5 and 6.

Figure 8:
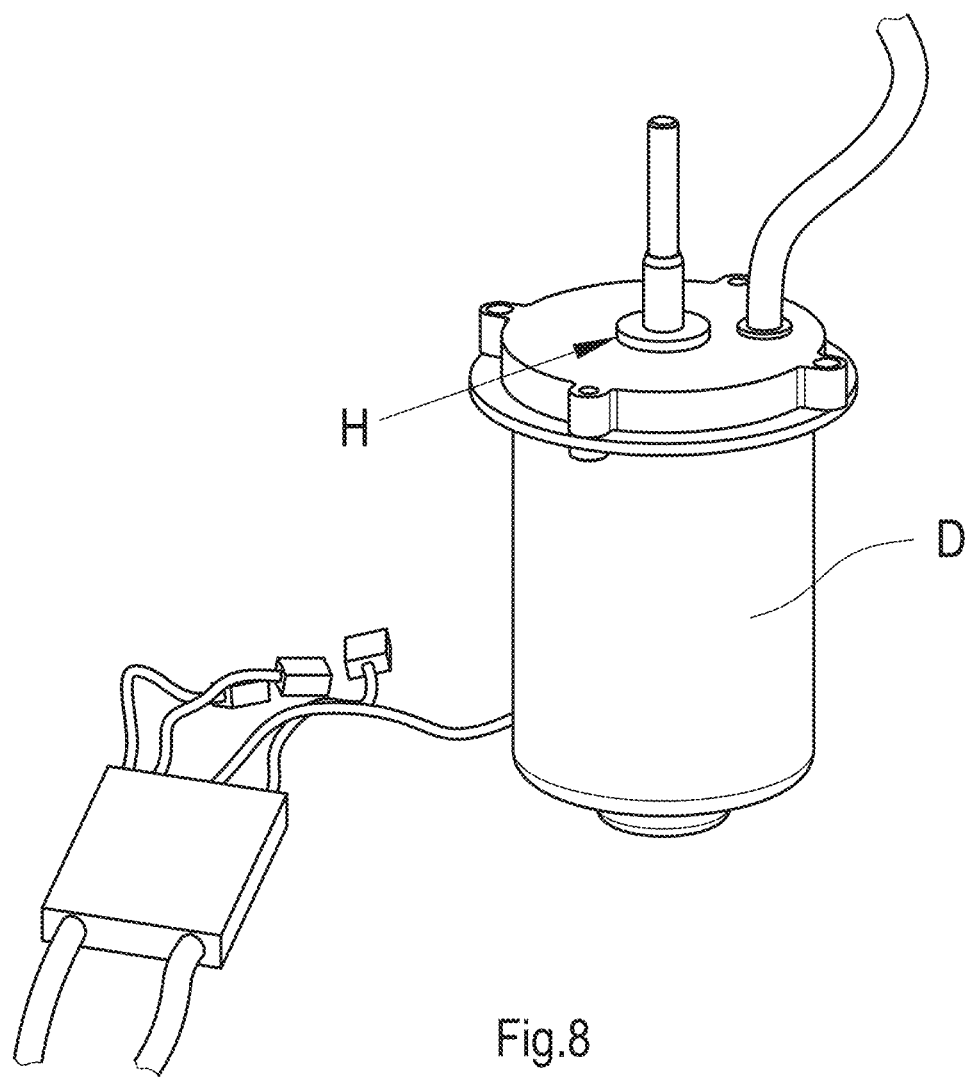
FIG. 8 is a perspective view of a prior art motor housing with a prior art cap.

The improved device also eliminates the need for the small O-ring seal H at the middle top ridge as needed in the prior art motor top cap D and as shown in FIG. 8.

Figure 9:
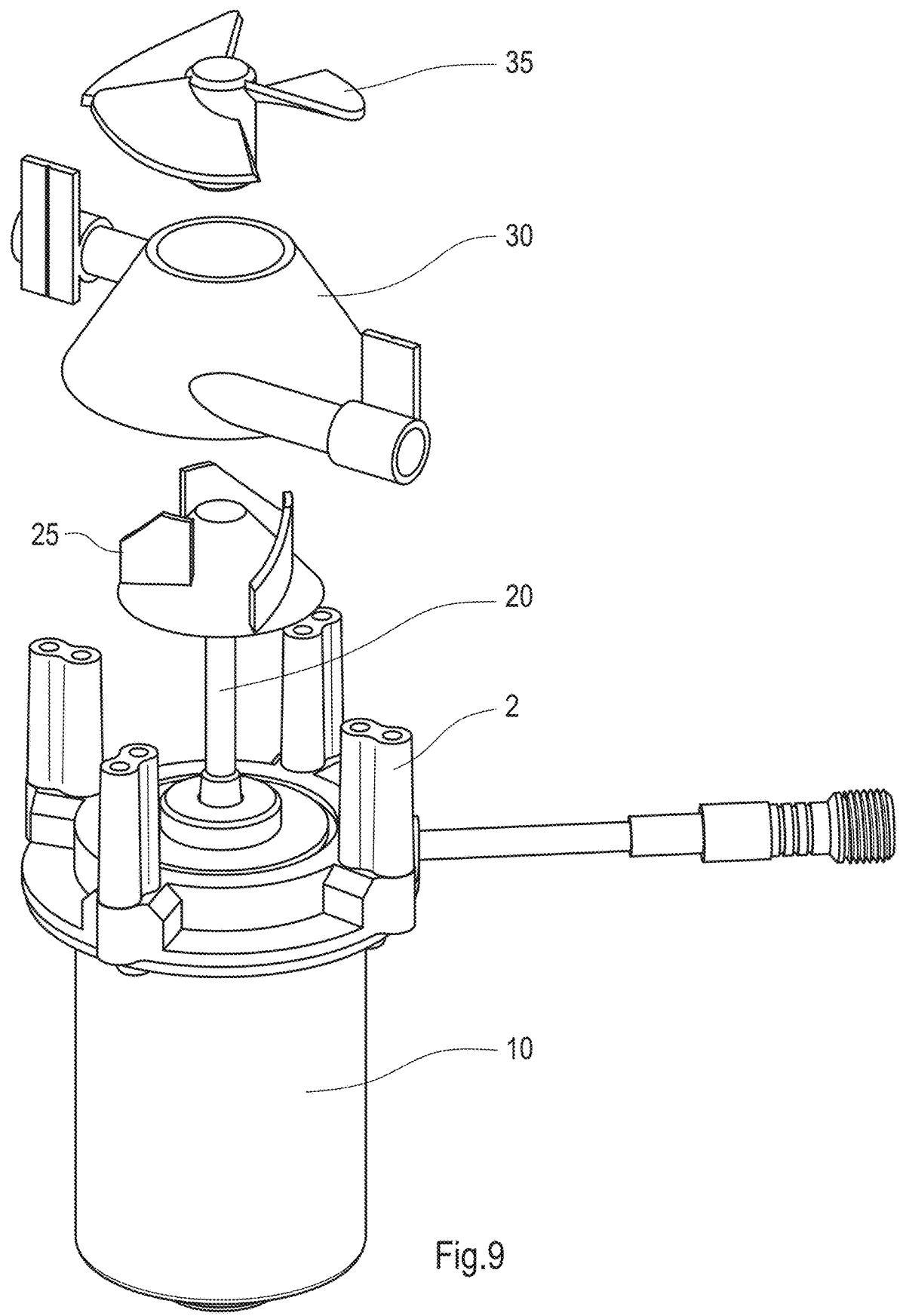
FIG. 9 is an exploded perspective view of the universal motor mount and cap of the present invention mounted on a motor mount and cap of the present invention mounted on a motor housing with the motor connected to a propeller and pressure wash device.
Figure 10:
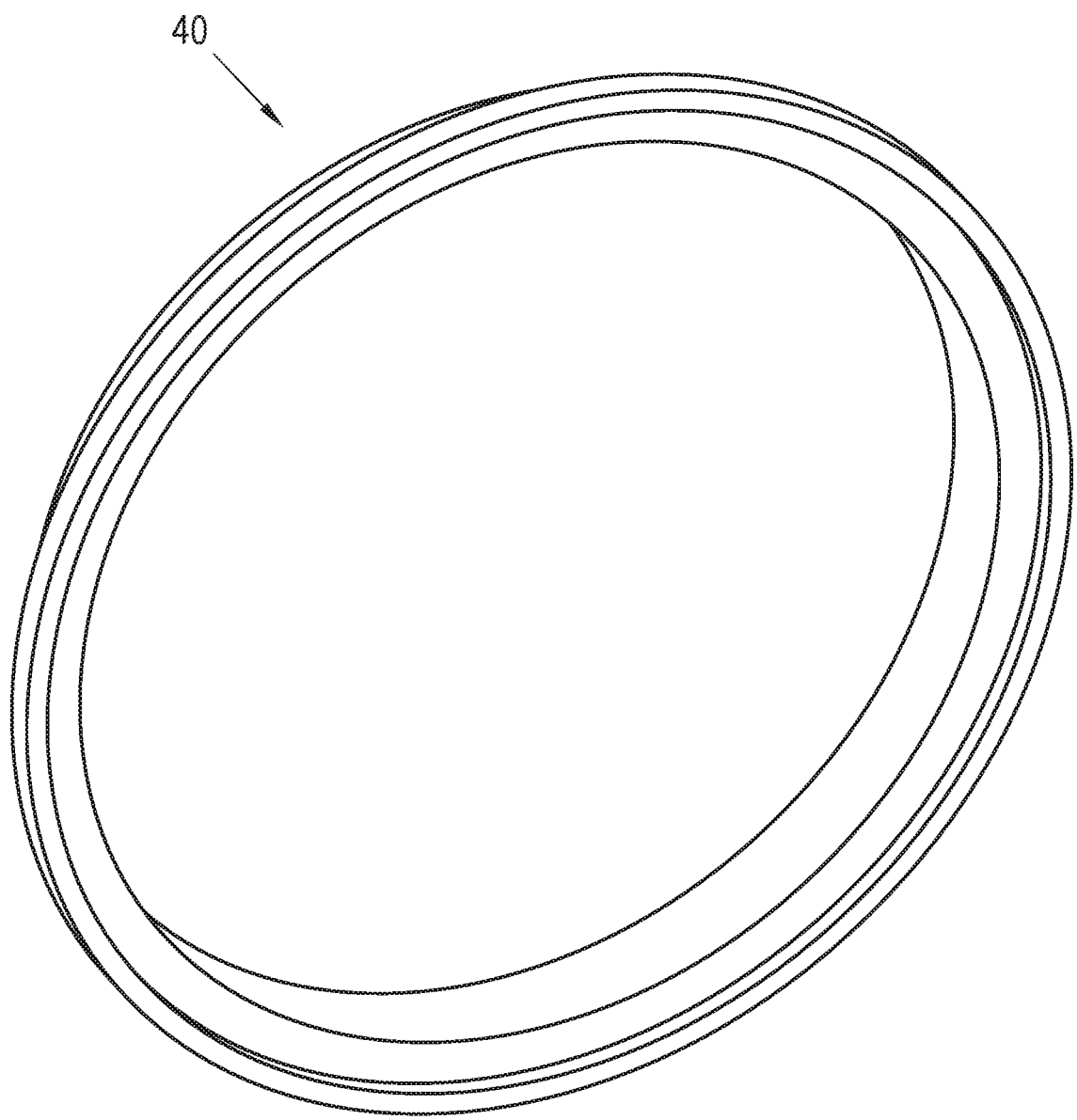
FIG. 10 is a perspective view of the improved motor can seal of the present invention.
Figure 11:
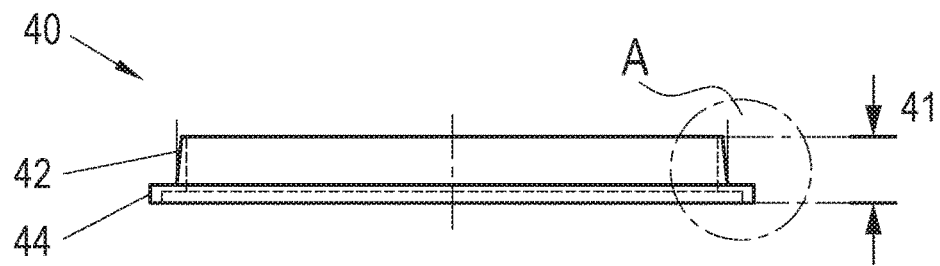
FIG. 11 is a side view of the improved motor can seal of the present invention.
Figure 12:
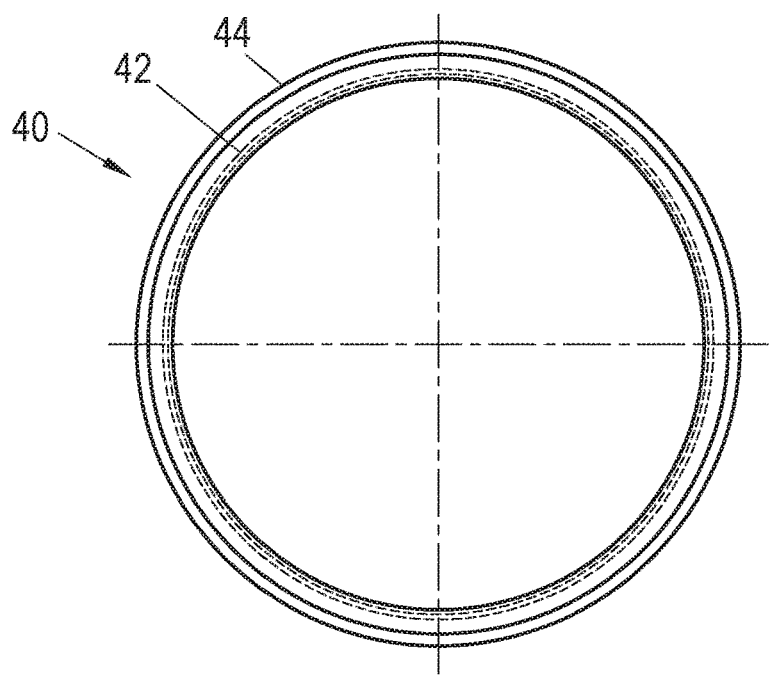
FIG. 12 is a top view of the improved motor can seal of the present invention.

FIG. 9 shows another advantage of the universal motor mount and cap C of the present invention. The universal motor mount and cap C containing the central through opening 3 accepts the shaft 20 of the motor there through. Once the motor shaft 20 is inserted, additional parts may be installed. Many pool cleaners now utilize pressure cleaners which consist of an impeller 25 and an impeller cover 30. For the pressure washer to work the impeller spins with the shaft 20 of the motor. The impeller cover 30 remains stationary. The impeller cover 30 has a pair of opposing sleeves that can sleeve over two posts of a universal motor mount and cap C to hold it in place. Once the impeller cover 30 is installed the propeller 35 is inserted on the distal end of the motor shaft 20.

The features of the invention illustrated and described herein are the preferred embodiments. Therefore, it is understood that the appended claims are intended to cover unforeseeable embodiments with insubstantial differences that are within the spirit of the claims.

What I claim is:

1. A motor can seal having a predetermined sealing surface for sealing a motor mount to a motor can within a motorized pool cleaner comprising:
    a) an outer seal having a first diameter, a first distal end, and a first height;
    b) an inner seal having a second diameter, a second distal end, and a second height; and
    c) an intermediate seal having a thickness connecting said outer seal to said inner seal, with said first distal end of said outer seal in an opposite direction as said second distal end of said inner seal with respect to said intermediate seal;

wherein said first diameter is larger than said second diameter, said second height is taller than said first height, said inner seal is tapered throughout towards said second distal end of said inner seal, and said first height, said second height and said thickness in combination is adapted to define said predetermined sealing surface.

2. The motor can seal of claim 1 wherein said inner seal has an inner wall and an outer wall, said inner wall extends perpendicular from said intermediate seal, and said outer wall is tapered towards said second distal end of said inner seal such that the cross sectional shape of said inner seal is a wedge.

3. The motor can seal of claim 1 wherein the outer wall is tapered at an angle of 6 degrees.

4. A universal device for capping and mounting a motor within a motorized pool cleaner having either a first sized housing or, alternatively, a second different sized housing, comprising:
    a base having an edge and first and second surfaces and a central through opening;
    at least first and second sets of generally cylindrical posts, each post having a curved surface, extending generally perpendicular from said first surface of said base, said first set of posts is adapted to engage said first sized housing of the pool cleaner and said second set of posts is adapted to, alternatively, engage said second sized housing of the pool cleaner, wherein said first and second sets of posts each comprises at least two posts;
    said first set of posts extending from said first surface of said base adjacent said edge, said first set of posts defining a first footprint;
    said second set of posts extending from said first surface of said base and each post of said second set of posts abuts a corresponding post of said first set of posts, wherein a portion of said curved surface of each post of said first set of posts abuts a portion of said curved surface of each corresponding post of said second set of posts, said second set of posts defining a second footprint smaller than said first footprint;
    a rim extending from said second surface; and
    a motor can seal on said rim comprises:
        a) an outer seal having a first diameter;
        b) an inner seal having a second diameter; and
        c) an intermediate seal connecting said outer seal to said inner seal;
    wherein said first diameter is larger than said second diameter and wherein said inner seal is tapered towards the distal end of said inner seal.

5. A universal device for capping and mounting a motor within a motorized pool cleaner having either a first sized housing or, alternatively, a second different sized housing, comprising:
    a base having an edge and first and second surfaces and a central through opening; and
    at least first and second sets of generally cylindrical posts, each post having a curved surface, extending generally perpendicular from said first surface of said base, said first set of posts is adapted to engage said first sized housing of the pool cleaner and said second set of posts is adapted to, alternatively, engage said second sized housing of the pool cleaner, wherein said first and second sets of posts each comprises at least two posts;
    said first set of posts extending from said first surface of said base adjacent said edge, said first set of posts defining a first footprint;

said second set of posts extending from said first surface of said base and each post of said second set of posts abuts a corresponding post of said first set of posts, wherein a portion of said curved surface of each post of said first set of posts abuts a portion of said curved surface of each corresponding post of said second set of posts, said second set of posts defining a second footprint smaller than said first footprint;

a shaft seal within the central through opening and said central through opening is sized and adapted to accept a motor shaft comprises:

a head section; and a body section having a first end and a second end, said first end of said body section abuts said head section;

extending from said first end of said body section towards said second end is a seal area;

wherein said seal area is hard chrome plated.

\* \* \* \* \*